US009221501B2

(12) United States Patent
Lavmand

(10) Patent No.: US 9,221,501 B2
(45) Date of Patent: Dec. 29, 2015

(54) PLATFORM SYSTEM FOR A CARGO COMPARTMENT OF A TRUCK, LORRY OR TRAILER

(71) Applicant: Lavmands Last & Karosseri A/S, Ringsted (DK)

(72) Inventor: Per Lavmand, Espergærde (DK)

(73) Assignee: Lavmands Last & Karosseri A/S, Ringsted (DK)

( * ) Notice: Subject to any disclaimer, the term of this patent is extended or adjusted under 35 U.S.C. 154(b) by 0 days.

(21) Appl. No.: 14/404,882

(22) PCT Filed: May 21, 2013

(86) PCT No.: PCT/EP2013/060387
§ 371 (c)(1),
(2) Date: Dec. 1, 2014

(87) PCT Pub. No.: WO2013/178502
PCT Pub. Date: Dec. 5, 2013

(65) Prior Publication Data
US 2015/0232134 A1    Aug. 20, 2015

(30) Foreign Application Priority Data

May 29, 2012   (DK) ................................ 2012 00367
Oct. 4, 2012   (DK) ................................ 2012 00606
Apr. 3, 2013   (DK) ................................ 2013 00196

(51) Int. Cl.
*B60P 1/02*    (2006.01)
*B62D 33/08*   (2006.01)
*B62D 33/04*   (2006.01)
*B62D 25/20*   (2006.01)

(52) U.S. Cl.
CPC . *B62D 33/08* (2013.01); *B60P 1/02* (2013.01); *B62D 25/2054* (2013.01); *B62D 33/04* (2013.01)

(58) Field of Classification Search
CPC .... B62D 33/08; B62D 33/04; B62D 25/2054; B60P 1/02; B60P 1/43; B60P 3/08
See application file for complete search history.

(56) References Cited

U.S. PATENT DOCUMENTS

| 4,701,086 A | 10/1987 | Thorndyke |
| 4,801,229 A * | 1/1989 | Hanada et al. ................. 410/26 |
| 5,525,026 A * | 6/1996 | DeMonte et al. ............. 414/542 |

(Continued)

FOREIGN PATENT DOCUMENTS

| EP | 0278558 | 8/1988 |
| EP | 0624491 | 11/1994 |
| WO | WO9000990 | 2/1990 |

*Primary Examiner* — Kaitlin Joerger
(74) *Attorney, Agent, or Firm* — K. David Crockett, Esq.; Niky Econony Syrengelas, Esq.; Crockett & Crockett, PC

(57) ABSTRACT

A platform system (5) for use in a cargo compartment of a truck, lorry or trailer. The platform system (5) is provided with a plurality of elevation platforms (20) with a substantially rectangular outline, onto which, in use, goods can be loaded. The elevation platforms (20) can be elevated when loaded. Each elevation platform (20) is guided by horizontally spaced and vertically extending guides. Each elevation platform is suspended from a set of cables, each of these cables being associated with each of the vertically extending guides and a first end of each of the cables in the set being associated with one corner of the rectangular elevation platform. The platform system is also provided with a plurality of actuators (25) with one actuator associated with each elevation platform (20). The second end of the cables in the set being operably connected one of the actuators (25).

22 Claims, 7 Drawing Sheets

(56) References Cited

U.S. PATENT DOCUMENTS

| | | |
|---|---|---|
| 5,915,913 A | 6/1999 | Greenlaw et al. |
| 6,027,290 A * | 2/2000 | Andre .............................. 410/24 |
| 6,368,034 B1 * | 4/2002 | Frye ................................ 410/26 |
| 6,485,237 B1 * | 11/2002 | Sandwith ........................ 410/24 |
| 6,983,979 B2 * | 1/2006 | Rasmussen .................... 296/156 |
| 7,610,636 B2 * | 11/2009 | Holmes et al. ..................... 5/118 |
| 2008/0067012 A1 * | 3/2008 | Kobrehel ....................... 187/377 |

* cited by examiner

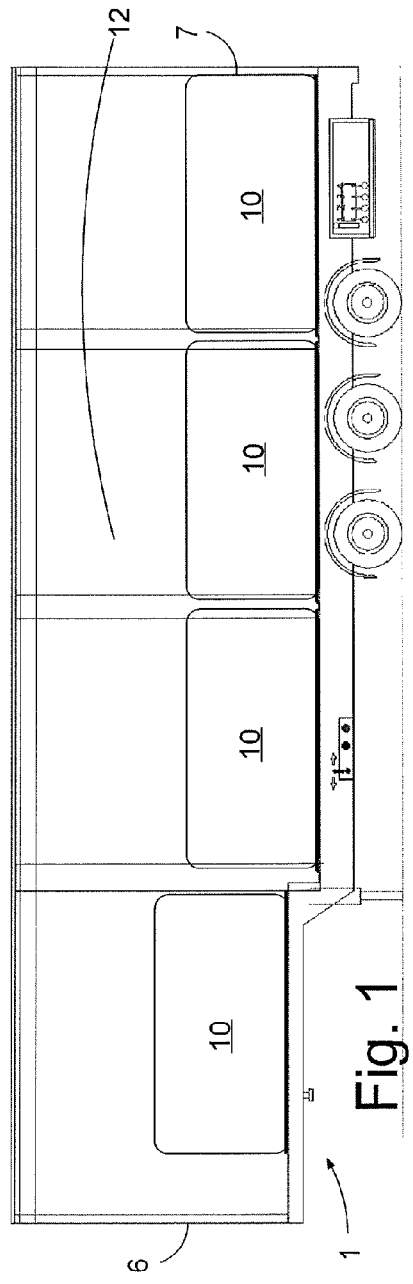
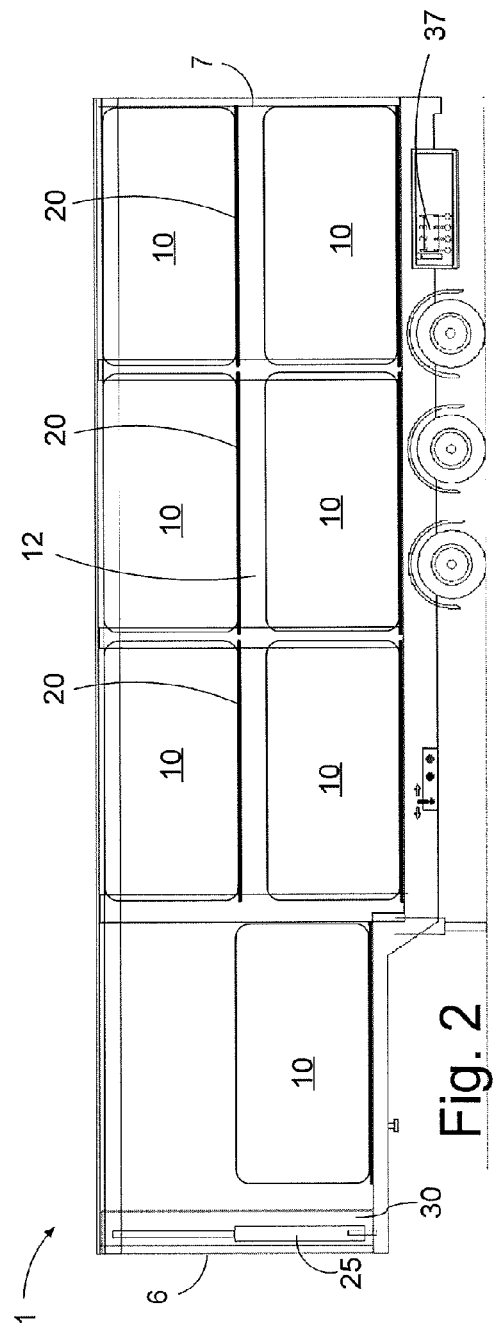

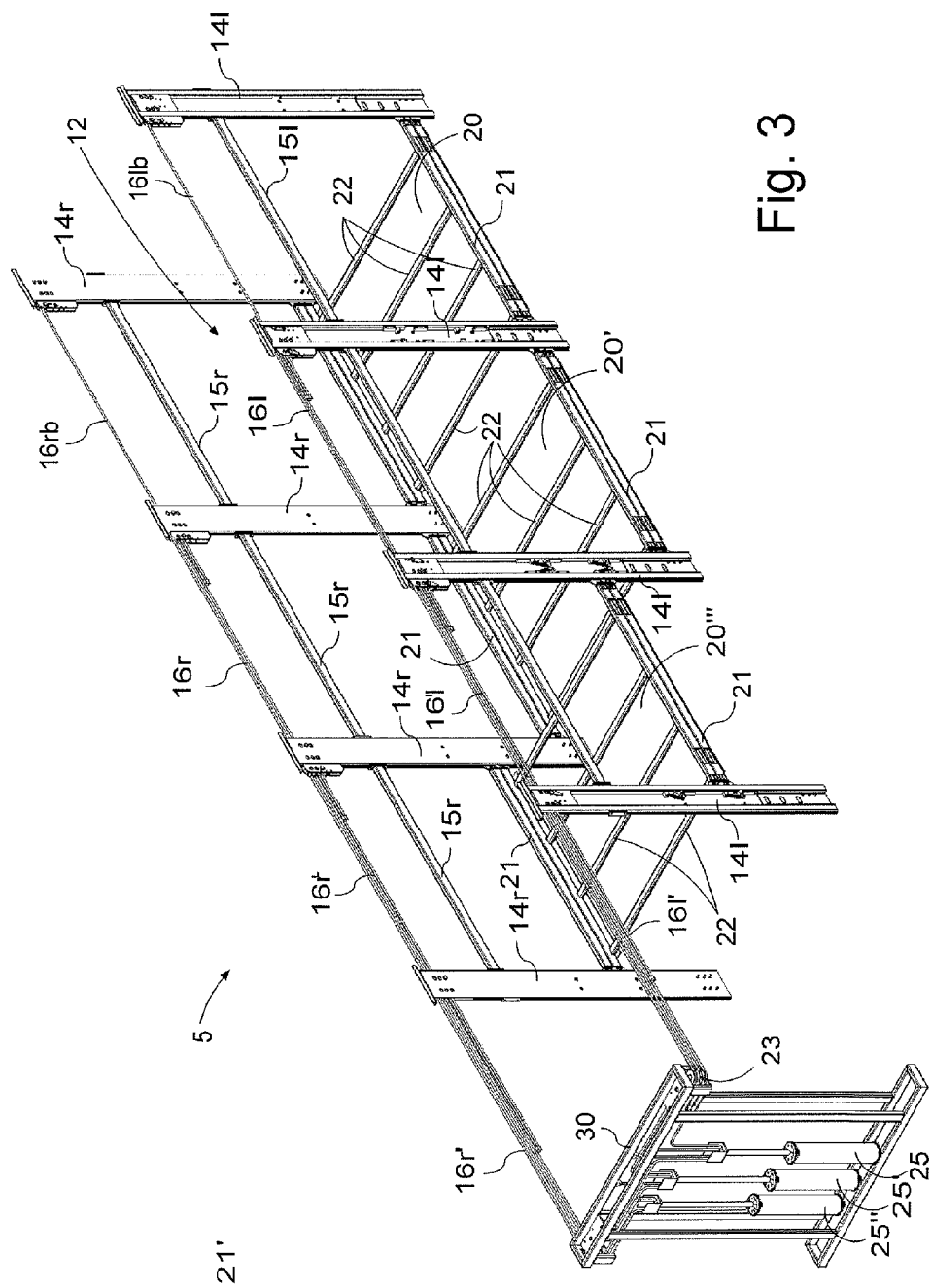

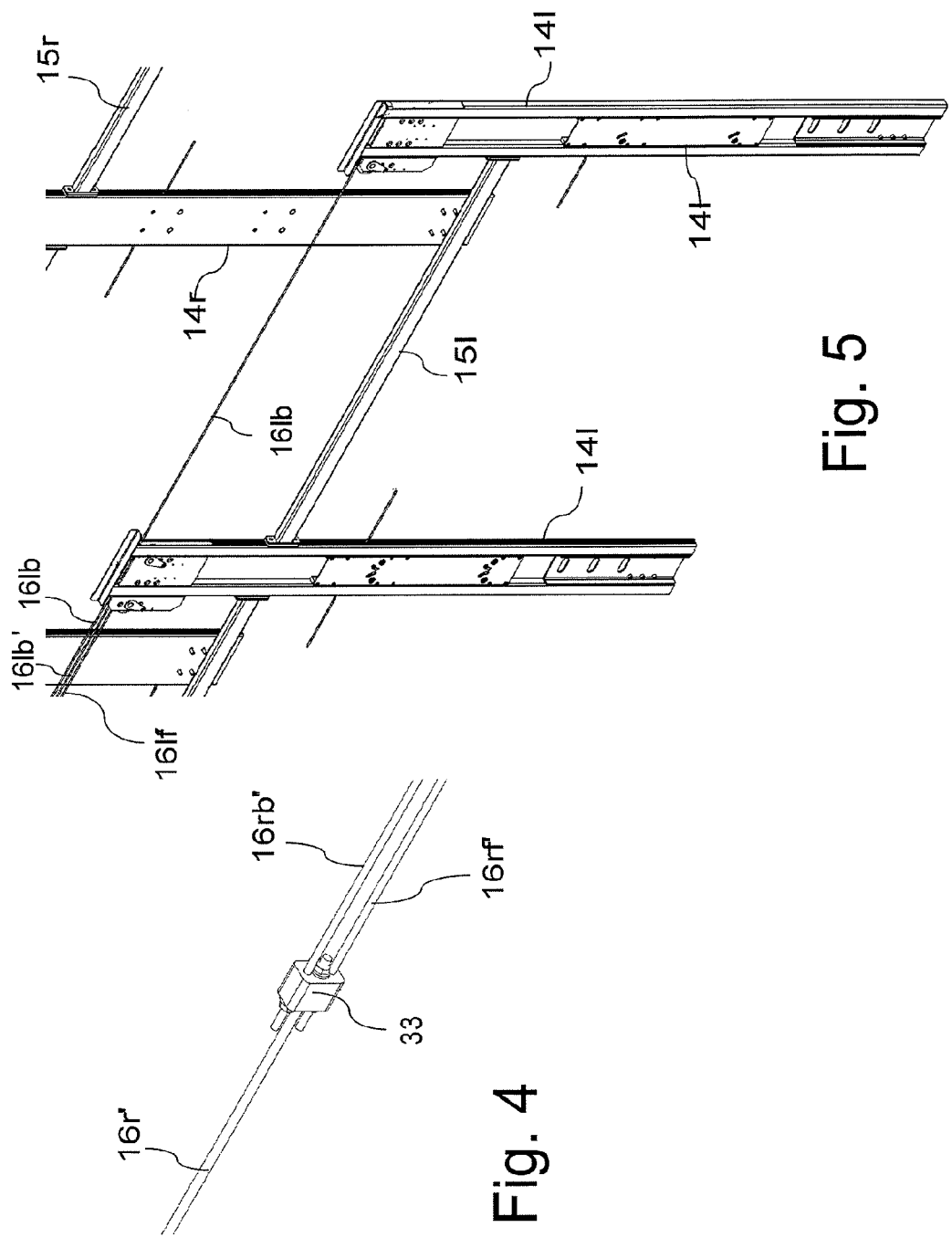

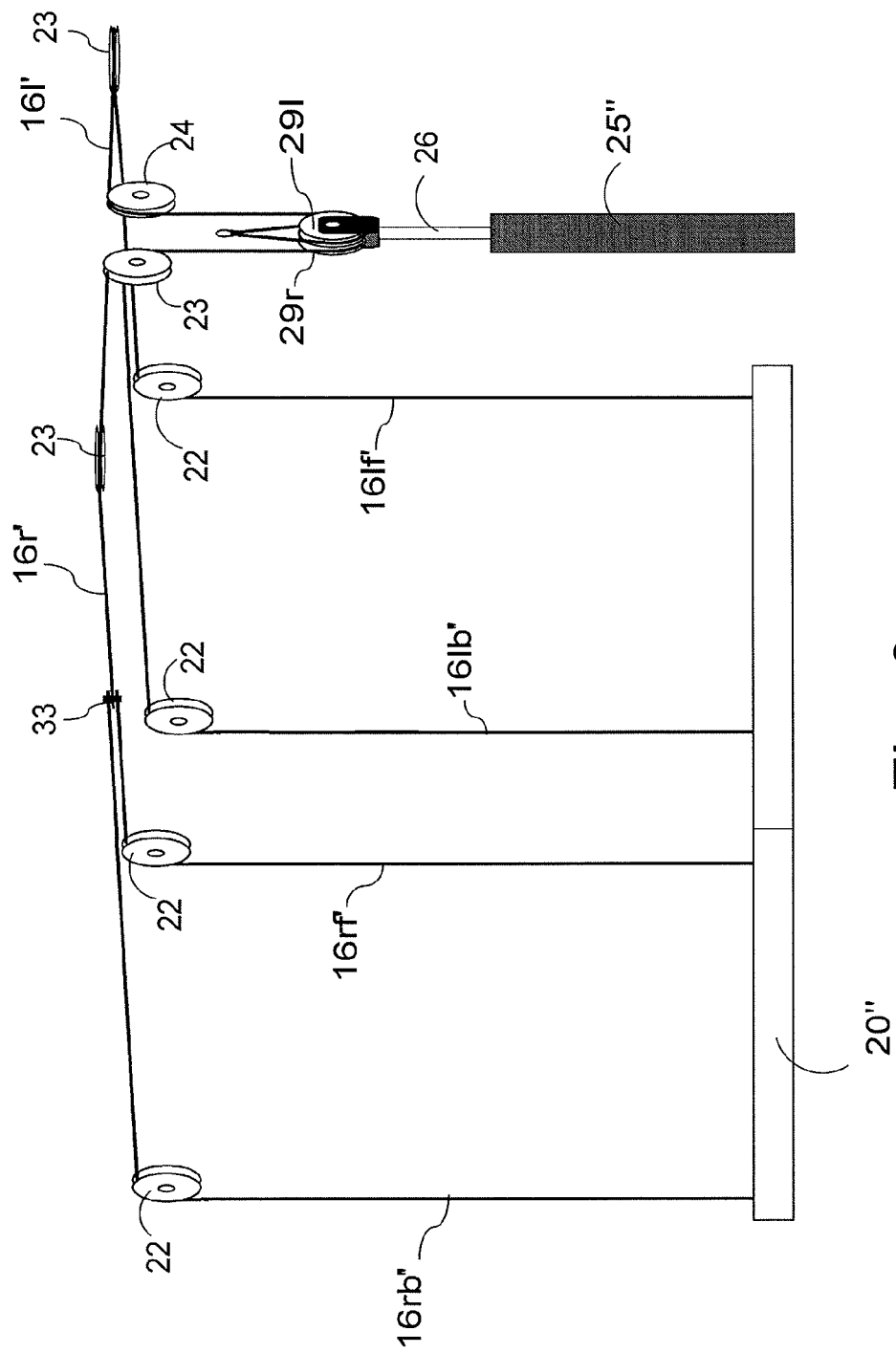

PLATFORM SYSTEM FOR A CARGO COMPARTMENT OF A TRUCK, LORRY OR TRAILER

The present disclosure relates to a platform system for a cargo compartment of a truck, lorry or trailer.

More particularly the invention relates to a platform system that is provided with plurality of elevation platforms with a substantially rectangular outline, onto which, in use, goods can be loaded and wherein the platforms can be elevated when loaded.

BACKGROUND ART

In the field of large transport vehicles large efforts are made to reduce energy consumption. One way of achieving this is by improving the effectiveness of the use of the cargo space.

Trucks and lorries are usually provided with a rectangular frame, and a number of solid panels attached to the rectangular frame and the rectangular frame is mounted on a chassis of the truck or lorry. Trailers are usually provided with a rectangular frame, and a number of solid panels attached to the rectangular frame. Such trailers are mounted on a chassis comprising suitable running gear, to allow connection of the trailer to a tractor unit for haulage purposes.

A standard type of conventional truck, lorry or trailer has a cargo room with floor space for four standard air cargo containers or pallets. These pallets or containers are also called unit load device (ULD). There are various types and sizes of these containers, but common for all the air cargo containers is that they are substantially lower than the available height of the cargo room of a standard type conventional truck, lorry or trailer and thus a large portion of the cargo space is not used when the truck, lorry or trailer is loaded with air cargo containers. Such air cargo containers are light weight constructions and may not be stacked directly on top of one another. Loaded air cargo containers are normally light in relation to the weight carrying capacity of trucks, lorries and trailers and thus having unused space above the containers in the cargo space of the truck, lorry or trailer is inefficient since it represents unused capacity.

A solution to this problem is to provide the cargo space with elevation platforms that are vertically moveable within the cargo space so that two or more containers or pallets can be transported above one another in the cargo space. Trucks, lorries and trailers with elevation platforms have been suggested in the past but their construction has been complicated and expensive.

DISCLOSURE OF THE INVENTION

On this background, it is an object of the invention to provide a platform system for use in a cargo compartment of a truck, lorry or trailer, that overcomes or at least relieve the problems of, or associated with the prior art platform systems.

This object is achieved by providing a platform system for use in a cargo compartment of a truck, lorry or trailer, the platform system comprising a plurality of elevation platforms with a substantially rectangular outline, onto which, in use, goods can be loaded, each elevation platform being guided by a plurality of horizontally spaced and vertically extending guides, preferably four, each elevation platform being suspended from a set of four cables, one of these cables being associated with one of the four vertically extending guides and a first end of each of the four cables in the set being associated with one corner of the elevation platform, a plurality of actuators with one actuator associated with each elevation platform, the second end of the four cables in the set being operably connected to the one actuator.

By providing elevation platforms that are suspended from cables and by connecting the set of cables associated with a single elevation platform to a dedicated actuator a simple, inexpensive and reliable elevation system is provided. Preferably the set of cables is operatively connected to the dedicated actuator through an arrangement of guide wheels or rollers and pulleys.

Preferably the actuator is a hydraulic cylinder. Hydraulic power can easily be provided by an electrically driven hydraulic power station on the truck, lorry or trailer. Hydraulics has a high power density and can be well controlled.

In an embodiment the two cables in a set whose first ends are connected to one and the same side of an elevation platform form a subset and are joined at a position and continue from that position towards the actuator as one cable. Thus the amount of cable and the amount of guides, guide wheels or rollers is reduced.

In an embodiment the plurality of hydraulic actuators are arranged in a frame that is disposed at or near one of the longitudinal ends of the elongated cargo space. Thus, the actuators can be well secured and take little space.

In another embodiment the cables in a set extend substantially vertical from a corner of a platform to a guide wheel or roller at or near the top of a vertically extending guide and extend horizontally from the guide wheel or roller towards the longitudinal end of the cargo space where the actuators are located.

In another embodiment the frame is a substantially rectangular frame and wherein the frame is provided with guide wheels or rollers at or near each of two of its corners associated with one side of the frame, these wheels or rollers guiding the cables in a turn of approximately 90 degrees, the turn preferably being a transition of a stretch wherein the cables extend along the longitudinal extent of the cargo space and a stretch wherein the cables extend at a substantially right angle to the longitudinal extent of the cargo space. Thus an effective guidance of the cables towards the actuator is achieved without consuming cargo space.

In another embodiment hydraulic cylinders are supported by the frame such that the longitudinal extend of the cylinders coincides with one common planar plane that extends at a substantially right angle to the longitudinal extend of the cargo space, and wherein the frame is provided with further guide wheels or rollers, one of the further guide wheels or rollers guiding a cable connected to a subset in a substantially 90 degrees bend towards the extremity of the hydraulic actuator associated with the subset concerned.

In yet another embodiment one end of the hydraulic actuator is secured to- and supported by the frame and the other free extremity of the hydraulic actuator is provided with two cable wheels, and wherein the cable connected to a subset of cables that is connected to one side of a platform is guided around the one of the two cable wheels and the second end of the cable connected to a subset of cables that is connected to the other side of the same platform is guided around the other of the two cable wheels.

In yet another example embodiment of the invention described above a platform system having a modular layout is contemplated comprising a platform system as described above and having a modular unit, said modular unit comprising at least one elevation platform and a fixed floor.

This modular unit is designed to permit each modular unit to be loaded and unloaded from the truck or lorry directly as a modular unit without having to remove the cargo contained within or on the modular unit. This will permit the loading and unloading of the modular unit at a cargo loading and unloading station without the need to have a truck, lorry or trailer present that has been permanently outfitted with an elevation platform system according to the present invention inside the cargo bay of the truck or lorry.

In a further embodiment of the platform system having a modular layout at least one actuator is arranged in a frame that forms part of the modular unit, preferably this frame is located topmost in the modular unit. Further, the cables or set of cables, are operatively connected to the at least one actuator through an arrangement of guide wheels or rollers and pulleys.

In a further embodiment of the platform system having a modular layout, the cables of a set of cables extend substantially vertically from the corners of the at least one elevation platform to an arrangement of guide wheels or rollers at or near the top of the vertically extending guides and extend horizontally from the arrangement of guide wheels or rollers towards an arrangement of pulleys operatively connected to an actuator.

Further as an embodiment, a platform system having a modular layout is described, wherein the at least one actuator is a linear actuator preferably being either a hydraulic actuator or driven by an electro motor.

Also as an embodiment a platform system having a modular layout is described, wherein the at least one actuator is positioned parallel to the fixed floor when arranged within the frame and when this frame located topmost in the modular unit.

In yet another embodiment of the platform system having a modular layout the cargo space is an elongated space with at least two modular units arranged in series in this elongated space.

Further, in order to secure the at least one elevation platform during transport, it is contemplated that a platform system according to any of the embodiments presented above must further comprise at least one locking unit on at least one of the vertically extending guides associated with the at least one elevation platform, this at least one locking unit being adapted to permit the at least one elevation platform to be raised and lowered when the platform system is parked, not moving or stationary, but locked to fixate the at least one elevation platform in an elevated position during movement or transportation of the at least one elevation platform.

Further objects, features, advantages and properties of the platform system according to the disclosure will become apparent from the detailed description.

BRIEF DESCRIPTION OF THE DRAWINGS

In the following detailed portion of the description, the invention will be explained in more detail with reference to the exemplary embodiments shown in the drawings, in which:

FIG. 1, is a view through side view of a prior art trailer loaded with four air cargo pallets, FIG. 2, is a view through side view of a trailer loaded with seven air cargo pallets according to an exemplary embodiment, FIG. 3 is a perspective view of the platform system according to an embodiment (FIG. 2 does not show the surrounding truck, lorry or trailer), FIG. 4 shows a detail of a cable connection of the platform system shown in FIG. 2, FIG. 5 shows a detail of a vertical supports of the platform system shown in FIG. 2, FIG. 6 shows a detail of the cable system and actuator of the platform system shown in FIG. 2.

DETAILED DESCRIPTION OF PREFERRED EMBODIMENTS

Figure 7:
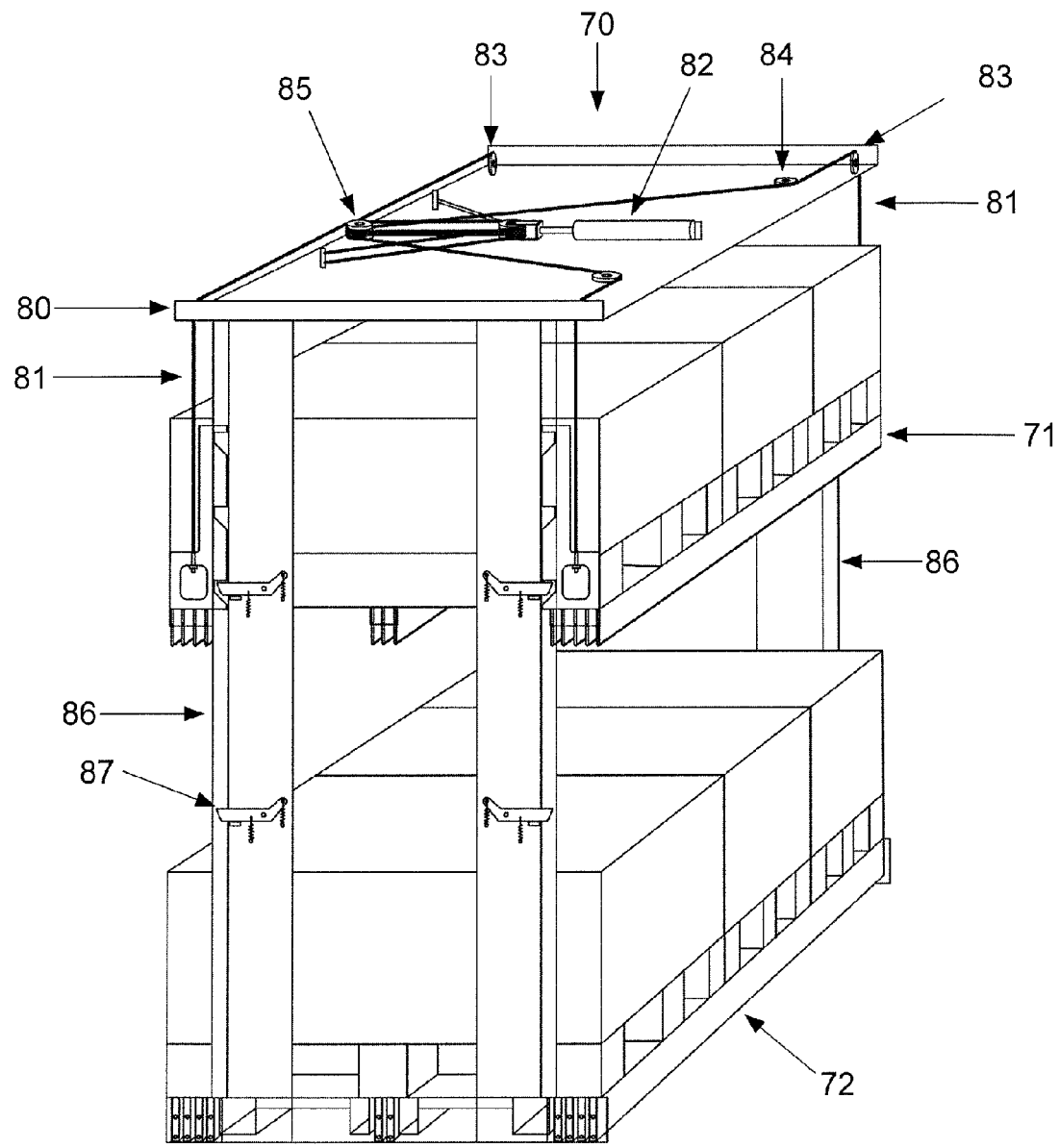
FIG. 7 shows is a perspective view of a modular unit according to an embodiment of the platform system of the present invention and FIG. 8 shows a group of modular units according to the invention aligned within a cargo bay of a truck, lorry or trailer.

In the following detailed description the platform system 5 will be described in relation to a truck, lorry or trailer 1 to which the platform system 5 is fitted.

FIG. 1 shows a conventional trailer 1 with an elongated rectangular cargo room 12 extending from a front end at the front 6 of the trailer 1 to a rear end at the end 7 of the trailer 1 and the cargo space has floor space for holding four air cargo containers/pallets 10. The upper part of the cargo space 12 is empty and is and cannot be used effectively. Air cargo containers 10 may not be stacked directly on top of one another, so a substantial part of the cargo space 12 (the upper part) is only filled with air during the transport of the air cargo pallets 10.

FIG. 2 shows a trailer according to an exemplary embodiment that is provided with the platform system 5 according to the present disclosure. The platform system 5 according to the present disclosure provides enough floor space for holding seven air cargo containers 10 in a trailer 1 of the same size as the trailer shown in FIG. 1 by the introduction of three elevation platforms 20,20',20". It is noted that a cargo space 12 with three elevation platforms 20,20',20" is illustrated in the present exemplary embodiment, but it is clear that less than three elevation platforms and more than three elevation platforms can be used in accordance with need and in relation to the size of the cargo space. The cargo space 12 is loaded and unloaded from the rear of the truck or trailer.

FIG. 3 shows the platform system 5 without any of the components of the truck, lorry or trailer. The platform system 5 comprises three elevation platforms 20,20',20" that have a rectangular outline and provide a rectangular floor space for loading cargo, like e.g. air cargo containers 10. In FIG. 3 the elevation platforms 20,20',20" are shown as open frames with longitudinally spars or beams 21 that form the sides of the platform and with a plurality (in the depicted embodiment four) traverse joists or beams 45. The floor of the cargo space (40) is provided with recesses (41) in which the elevation platforms 20,20',20" can be received in their lowest position so that a flush or essentially flush cargo floor (40) is created when the platforms 20,20',20" are in the lowest position. In trucks, lorries or trailers for air cargo the cargo floor (40) can be provided with a plurality of rollers that allow the air cargo pallets 10 to be pushed/rolled in without the use of a pallet truck or the like. In trucks or trailers for regular cargo; the cargo floor (40) with the platforms countersunk in the cargo floor is flush or essentially flush and allow pallet trucks to operate on the cargo floor (40). After the air cargo or regular cargo has been placed at the desired position on the cargo floor (40) the relevant platform is lifted and the joists or beams 45 engage the bottom of the cargo and lift it up to the desired height.

However, it is understood that the top surface of the platforms 20 can be covered by a floor plate if a particular application of the platform system should require this. The three platforms 20,20',20" are disposed in series inside the elongated cargo room 12. In the shown embodiment the elevation platforms 20,20',20" are identical in shape and size, but it is understood that the elevation platforms 20 can be of different size and shape. The elevation platforms 20,20',20" can be elevated when loaded, i.e. they can be moved in the vertical direction up and down, both when they are loaded with cargo such as e.g. an air pallet and when they are not loaded.

Each elevation platform 20 is guided by four horizontally spaced and vertically extending guides. The vertically extending guides are formed by vertical posts 14*l*, 14*r*. The vertical posts 14*l*, 14*r* are secured to and supported by the truck, lorry or trailer 1. One vertically extending guide is disposed at or near a corner of the rectangular elevation platforms. A vertical post 14*l*, 14*r* which is not located at one of the longitudinal extremities of the series of elevation platforms, can serve as a vertically extending guide for the elevation platform 20 that is disposed to the front of the vertical post 14*l*, 14*r* concerned, and as a vertically extending guide for the elevation platform 20 disposed to the rear of the vertical post 14*l*, 14*r* concerned.

As shown in FIG. 6 for one of the elevation platforms 20", each elevation platform 20,20',20" is suspended from a set of four cables 16*rb*, 16*rf*, 16*lb*, 16*lf*, 16*rb*', 16*rf*', 16*lb*', 16*lf*', 16*rb*", 16*rf*", 16*lb*", 16*lf*", one of these cables in a set being associated with one of the four vertically extending guides 14*l*,14*r*, and a first end of each of the four cables in the set being associated with one corner of the rectangular elevation platform 20. The second end of each of the four cables in a set is operably connected to an actuator 25,25',25". In the present embodiment the actuator is a hydraulic cylinder 25,25',25". The hydraulic cylinders 25,25',25" are connected to a source of hydraulic fluid via control valves that can be operated by an operator so as to allow individual control over the elevation of the elevation platforms 20.

The plurality of hydraulic actuators 25,25',25" is arranged in a frame 30 that is disposed at or near one of the longitudinal ends of the elongated cargo space 12, in the present cars the frame 30 is disposed at the front of the cargo space, and the frame 30 is secured to and supported by the truck, lorry or trailer 1.

As shown in FIG. 4 the two cables in a set whose first ends are connected to one and the same side of a platform form a subset and are joined by a connector 33 a at a position and continue from that position towards the actuator 25,25',25" as one cable 16*r*,16*r*',16*r*",16*l*, 16*l*',16*l*".

The cables in a set extend substantially vertically from a corner of an elevation platform 20 to a guide wheel or roller 22 at or near the top of a vertical guide 14*l*,14*r* and extend horizontally from the guide wheel or roller towards 22 the longitudinal end of the cargo space 12 where the actuators 25,25',25" are located. The vertical posts 14*l*, 14*r* are also provided with guide means for guiding one or more horizontally extending cables through their upper portion. The cables extend in a longitudinal direction from a guide wheel 22 to along the top and side of the cargo room and extend towards the front end 6 of the cargo room. On their way to the front 6 of the cargo room the cables connected to the more rearward placed elevation platforms pass though the upper part of the vertical posts 14*l*, 14*r*.

The frame 30 is a substantially rectangular. In the present embodiment the frame 30 is composed of welded beams. The frame 30 is placed with its main extent directed vertically and at a right angle to the longitudinal extent of the cargo space and at the end of the cargo space 12, i.e. such that the longitudinal extend of the cylinders coincides with one common planar plane that extends at a substantially right angle to the longitudinal extend of the cargo space 12. The hydraulic cylinders 25,25',25" are connected to and supported by the frame 30 and disposed with their longitudinal extent in a vertical direction.

The frame 30 is provided with guide wheels or rollers 23 (one for each elevation platforms 20,20',20") at or near each of two of its upper and oppositely disposed corners. These wheels or rollers 23 guide the cables in a turn of approximately 90 degrees. The turn is a transition of a stretch wherein the cables extend along the longitudinal extent of the cargo space near the top of the cargo space 12 and near the side walls of the cargo space and another stretch wherein the cables extend horizontally and at a substantially right angle to the longitudinal extent of the cargo space 12.

The frame 30 is provided with further guide wheels or rollers 24, one of the further guide wheels or rollers 24 guiding a cable connected to a subset in a substantially degrees bend towards the extremity of the hydraulic actuator 25,25', 25" associated with the subset concerned.

One end of the hydraulic actuator 25,25',25" is secured to and supported by the frame 30 and the other free extremity of the actuator 25,25',25" is provided with a two cable wheels 29*r*",29*l*". The cable connected to a subset of cables that is connected to one side of an elevation platform 20 is guided around the one of the two cable wheels 29*r*, 29*l* and the second end of the cable connected to a subset of cables that is connected to the other side of the same elevation platform 20 is guided around the other of the two cable wheels. The second end of the cables 16*l*,16*r*, 16*l*,16*r*', 16*l*,16*r*", is secured to the frame 30 at a position above the free end of the respective hydraulic cylinder 25,25',25".

In operation an operator controls the position of the hydraulic actuators 25,25',25" via a control panel 37. The control panel can also be a remote device that is in wired or wireless connection with the control valves. By extending the hydraulic cylinder 25,25',25" the elevation platform connected thereto 20,20',20" is lowered. By retracting the hydraulic cylinder 25,25',25" the elevation platform connected thereto 20,20',20" is raised. The elevation platforms 20,20',20" can be raised and lowered with and without cargo loaded onto the platform.

FIG. 7 shows another example embodiment of the platform system (5) according to the present invention. In this embodiment, the platform system (5) is arranged within a modular unit (70) which is sized to fit into the cargo bay of a truck, lorry or trailer and further to be connected to additional modular units (70) in order to fill the cargo bay to the extent required by the transportation job at hand.

The modular unit (70) comprises a fixed floor (72) and at least one elevation platform (71), preferably one elevation platform (71) which can be raised and lowered by a system of cables (81), guide wheels or rollers (83,84) and pulleys (85) operatively connected to the at least one actuator (82) which is arranged within a frame (80). In the embodiment shown in FIG. 7, the frame (80) is located at the top of the modular unit (70) thereby becoming an integral part of the stabilizing structure of the modular unit (70). Additionally to forming part of the supporting structure of the modular unit (70), it is a further advantage of locating the frame (80) at the top of the modular unit (70) that this will maximize the use of the available space of the cargo bay of a truck, lorry or trailer and simplify the cable and pulleys structure.

The orientation of the at least one actuator (82) within the frame (80) is not essential and the skilled person will know how to adjust said system of cables (81), guide wheels or rollers (83,84) and pulleys (85) to suit any given orientation of said at least one actuator (82) within said frame (80).

The construction of the at least one elevation platform (71) can be in the form of an open or a closed frame (75) supported by joists or beams (45) for constructional stability. It is preferred that the construction is similar to the construction described in FIG. 3 for the elevation platforms (20,20',20") wherein these were shown as open frames with longitudinally spars or beams (21) forming the sides of the platform and with a plurality (in the depicted embodiment four) traverse joists or beams (45) forming the floor (75). The frame (75) may further be covered to form a covered floor (76).

The fixed floor (72) can be provided with recesses (41) in which the at least one elevation platform (71) can be received in its lowest position so that a flush or essentially flush fixed floor (72) is created. This allows pallet trucks to operate on the fixed floor (72). Alternatively, the fixed floor (72) can be provided with a plurality of rollers that allow the air cargo pallets 10 to be pushed/rolled in without the use of a pallet truck or the like. After the air cargo or regular cargo has been placed at the desired position on the fixed floor (72) the at least one elevation platform is lifted and engage the bottom of the cargo and lift it up to the desired height.

In the embodiment of the modular unit (70) shown in FIG. 7, the cables (81) used to suspend the elevation platform (71) extend substantially vertically from the corners of the elevation platform (71) towards the arrangement of guide wheels or rollers (83,84) at or near the top of the vertically extending guides (86) and further extend horizontally from the arrangement of guide wheels or rollers (83,84) towards the arrangement of pulleys (85) operatively connected to the actuator (82).

In the embodiment shown in FIG. 7, two guide wheels or rollers (83,84) are shown, but it should be understood that the number of guide wheels or rollers are not limited to that. The embodiment shown in FIG. 7 will work with only one guide wheel or roller (83), and more guide wheels or rollers, extra to the part (84), may be added to the construction if required.

The actuator (82) may be chosen from any suitable actuator, preferably a linear actuator, more preferably a linear electric actuator. However, pneumatic or electric actuators, such as pneumatic cylinders, electrically driven spindle actuators, winches, such as hydraulic- or electric winches and the like can also be used.

The embodiment shown in FIG. 7 may be modified by the addition of extra elevation platforms and the necessary system of guide wheels, rollers and pulleys operatively associated with each further actuator and elevation platform. It is contemplated that such a system having multiple elevation platforms in the modular unit (70) may be beneficial in some cargo transportation situations, like in a truck, lorry or trailer used to transport smaller units of cargo which cannot easily be stacked by other means and wherein stacking by hand would be considered problematic for reasons of work place safety.

Figure 8:
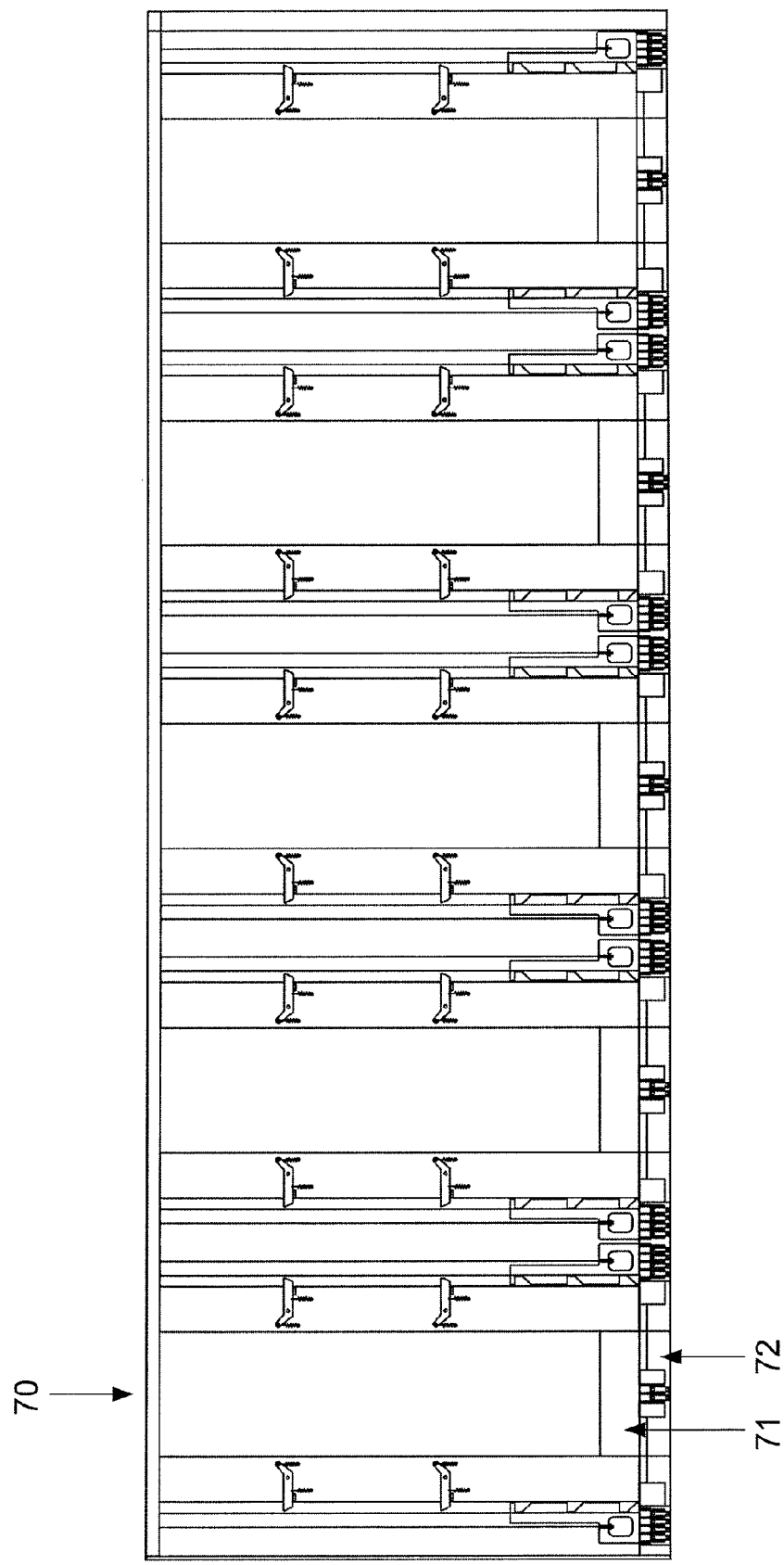

FIG. 8 shows an embodiment of the present invention wherein a platform system (5) comprising at least two modular units (70) is arranged in series in an elongated cargo bay of a truck, lorry or trailer.

In order to ensure the necessary safety during transportation, a platform system (5) according to any of the embodiments disclosed herein should further comprise at least one locking unit (87) on at least one of said vertically extending guides (14r,14l,86), said at least one locking unit (87) being adapted to permit said at least one elevation platform (20,20', 20",71) to be raised and lowered when said platform system (5) is parked, not move or stationary but locked to fixate said at least one elevation platform (20,20',20",71) in an elevated position during movement or transportation of said elevation platform.

In a preferred embodiment of the present invention, the cargo floor (40) or the fixed floor (72) is provided (as already described) with recesses (41) which permit any supporting traverse joists or beams (45) to be received into said recesses (41) in the lowest position of said at least one elevation platform (20,20',20",71) to provide a flush or substantially flush cargo floor (40) or fixed floor (72).

Such a flush or substantially flush floor is desirable in order to move e.g. pallet lifters across said floor without encountering any mechanical hindrances or obstacles. Such mechanical hindrances or obstacles can e.g. be in the form of pits formed by said recesses (41) or objects blocking the path such as said traverse joists or beams (45). It is generally recognized that for a manually operated pallet lifter not having a motor acting on the wheels of said manually operated pallet lifter, the depth of a pit or the height of a blocking object may not differ from the average level of the surrounding floor by more than 5 to 8 mm before traversing said obstacle becomes difficult for the average operator of such a manually operated pallet lifter.

Figure 9:
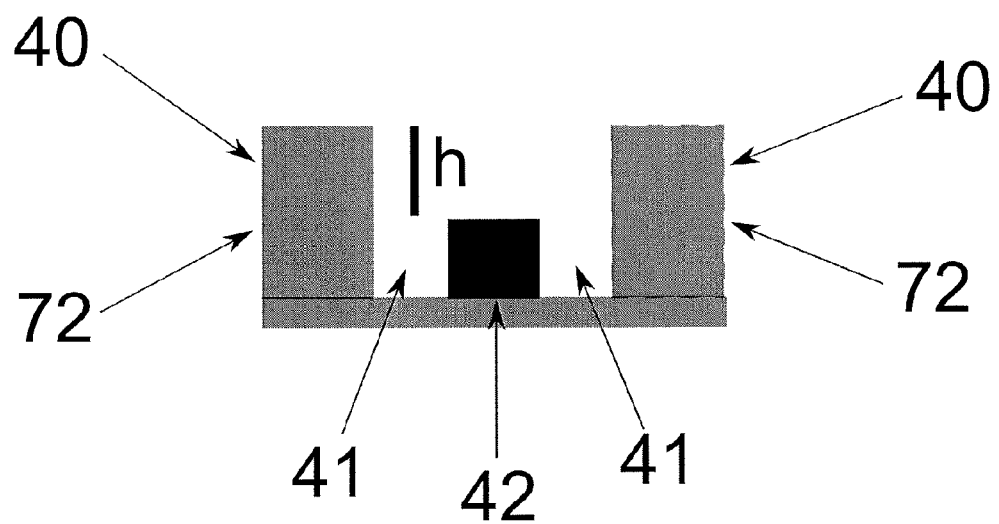
FIG. 9 shows a cross-section of the cargo floor or the fixed floor with two recesses and a central pillar for supporting an elevation platform. The pillar is lowered a distance h compared to the adjacent floor.

FIG. 9 shows a cross-section of the cargo floor (40) or the fixed floor (72) wherein at least two recesses (41) have been provided. Between the at least two recesses (41) at least one pillar (42) is located, the at least one pillar (42) having been lowered a distance h compared to the adjacent floor (40,72). When a traverse joist or beam (45) having a substantially U-shaped profile, is lowered to its lowest position, the legs of the substantially U-shaped profile will enter said recesses (41) and the bottom of said substantially U-shaped profile will rest upon the pillar (42) and be supported during loading and unloading. In this manner, the entire body or substantially the entire body of the traverse joist or beam (45) can be positioned within the pit formed by said floor (40,72), said recesses (41) and said pillar (42).

In a preferred embodiment of the present invention the distance h is so chosen that it will neither create a pit of such depth that it cannot be traversed by e.g. a manually operated pallet lifter nor such that it will push a traverse joist or beam (45) resting on said pillar (42) so far above the average level of the surrounding floor that an insurmountable obstacle to e.g. a manually operated pallet lifter is generated. Preferably h is smaller than 10 mm, more preferably smaller than 8 mm but most preferably smaller than 5 mm.

It is preferred that when a substantially U-shaped traverse joist or beam (45) is employed in the construction of an elevation platform (20,20',20",71) for use with the present platform system (5), said substantially U-shaped traverse joist or beam (45) is constructed to have a first section (46) so configured that upon lowering the at least one elevation platform (20,20',20",71), the substantially U-shaped traverse joist or beam (45) will guide itself into the recesses (41) and over the pillar (42); and a second section (47) so configured that when the substantially U-shaped traverse joist or beam (45) is in its lowest position and resting atop of the pillar (42), no or only little free space between pillar (42) and said second section of the traverse joist or beam (45) is present, and wherein said first (46) and second (47) sections are so arranged that upon lowering said substantially U-shaped traverse joist or beam (45) over said pillar (42), said first section (46) initially is closest to said pillar (42).

One example of such a construction could be a substantially U-shaped traverse joist or beam (45) having a first section (46), said first section being funnel shaped with the funnel opening being substantially wider than the width of said pillar (42), and a second section (47), said second section (47) having a width substantially corresponding to the width of said pillar (42).

Although the teaching of this application has been described in detail for purpose of illustration, it is understood that such detail is solely for that purpose, and variations can be made therein by those skilled in the art without departing from the scope of the teaching of this application. For example, although the platform system according to this disclosure has been described with reference to air cargo pallets, it is clear that the platform system can be used with various types of goods, pallets and containers.

For example, the platform system has been described with reference to hydraulic cylinders as actuators. However, pneumatic or electric actuators, such as pneumatic cylinders, electrically driven spindle actuators, winches, such as hydraulic- or electric winches and the like can also be used.

The term "comprising" as used in the claims does not exclude other elements or steps. The term "a" or "an" as used in the claims does not exclude a plurality.

The invention claimed is:

1. A platform system (5) for use in a cargo compartment of a truck, lorry or trailer (1), the platform system comprising:
    at least one elevation platform (20,20',20",71) with a substantially rectangular outline, onto which, in use goods can be loaded,
    the at least one elevation platform (20,20',20",71) being guided by a plurality of horizontally spaced and vertically extending guides, preferably four vertically extending guides,
    each at least one elevation platform (20,20',20",71) being suspended from a set of cables (16rb,16rf,16lb,16lf, 16rb',16rf',16lb', 16lf',16rb',16rf",16lb",16lf",81),
    at least one hydraulic actuator (25,25',25",82), said at least one hydraulic actuator being associated with said at least one elevation platform (20,20',20",71), and
    a second end of a cable in a said set of cables being operably connected to said at least one actuator (25,25',25",82); and
    wherein cables in a set whose first ends are connected to one and the same side of an elevation platform (20,20', 20",71) form a subset and are joined at a position and continue from that position towards the actuator as one cable; and
    one end of the hydraulic actuator (25,25',25") is secured to- and supported by said frame (30) and the other free extremity of the hydraulic actuator (25,25',25") is provided with two cable wheels (29l,29r), and wherein the cable connected to a subset of cables that is connected to one side of an elevation platform is guided around the one of the two cable wheels and the second end of the cable connected to a subset of cables that is connected to the other side of the same elevation platform is guided around the other of the two cable wheels (29l,29r).

2. A platform system (5) according to claim 1, wherein said cargo space (12) is an elongated space with at least two elevation platforms ((20,20',20",71) arranged in series in said elongated space.

3. A platform system (5) according to claim 1 wherein the cables (16rb,16rf, 16lb,16lf,16rb', 16rf',16lb',16lf',16rb', 16rf",16lb",16lf") or set of cables is operatively connected to the actuators (25,25',25") through an arrangement of guide wheels or rollers (22,23,24) and pulleys (29r,29l).

4. A platform system (5) according to claim 1, wherein the plurality of hydraulic actuators (25,25',25") is arranged in a frame (30) that is disposed at or near one of the longitudinal ends (6,7) of said elongated cargo space (12).

5. A platform system (5) according to claim 1, wherein the cables in a set extend substantially vertically from a corner of an elevation platform (20,20',20") to a guide wheel or roller (22) at or near the top of a vertically extending guide and extend horizontally from said guide wheel or roller (22) towards the longitudinal end (6,7) of said cargo space (12) where said actuators (25,25',25") are located.

6. A platform system (5) according to claim 1, wherein said frame (30) is a substantially rectangular frame and wherein said frame is provided with guide wheels or rollers (23) at or near each of two of its corners associated with one side of the frame, these wheels or rollers (23) guiding said cables in a turn of approximately 90 degrees, said turn preferably being a transition of a stretch wherein the cables extend along the longitudinal extent of said cargo space (12) and a stretch wherein the cables extend at a substantially right angle to the longitudinal extent of the cargo space (12).

7. A platform system (5) according to claim 1, wherein the hydraulic cylinders (25,25',25") are supported by said frame (30) such that the longitudinal extend of the hydraulic cylinders (25,25',25") coincides with one common planar plane that extends at a substantially right angle to the longitudinal extend of said cargo space (12), and wherein said frame is provided with further guide wheels or rollers (24), one of said further guide wheels or rollers (24) guiding a cable connected to a subset in a substantially 90 degrees bend towards the extremity of the hydraulic- actuator (25,25',25") associated with the subset concerned.

8. A platform system (5) according to claim 1, wherein the vertically extending guides are provided with two guide wheels (22) at or near their upper end and wherein some of the vertically extending guides are provided with guide means for guiding one or more horizontally extending cables at or through their upper portion.

9. A platform system (5) according to claim 1, wherein the at least one elevation platform (71) is part of a modular unit (70), said modular unit (70) further comprising a fixed floor (72).

10. A platform system (5) according to claim 9 wherein the actuator (82) is arranged in a frame (80) that forms part of the modular unit (70), preferably said frame (80) is located topmost in said modular unit (70).

11. A platform system (5) according to claim 9 wherein the cables (81) or set of cables is operatively connected to said actuator (82) through an arrangement of guide wheels or rollers (83,84) and pulleys (85).

12. A platform system (5) according to claim 9, wherein said cables (81) of a set of cables extend substantially vertically from the corners of said elevation platform (71) to an arrangement of guide wheels or rollers (83,84) at or near the top of said vertically extending guides (86) and extend horizontally from said arrangement of guide wheels or rollers (83,84) towards said arrangement of pulleys (85) operatively connected to said actuator (82).

13. A platform system (5) according to claim 9, wherein the actuator (82) is an actuator other than a hydraulic cylinder, preferably a linear actuator, more preferably comprising an electro motor.

14. A platform system according to claim 9, wherein the actuator (82) is positioned parallel to said fixed floor (72) when arranged within said frame (80) and when said frame (80) is located topmost in said modular unit (70).

15. A platform system (5) according to claim 9, wherein said cargo space (12) is an elongated space with at least two modular units (70) arranged in series in said elongated space.

16. A platform system (5) according to claim 9, further comprising at least one locking unit (87) on at least one of said vertically extending guides (14r,14l,86), said at least one locking unit (87) being adapted to permit said at least one elevation platform (20,20',20",71) to be raised and lowered when said platform system (5) is parked, not move or stationary but locked to fixate said at least one elevation platform (20,20',20",71) in an elevated position during movement or transportation of said elevation platform.

17. A cargo floor (40) or a fixed floor (72) for use in a platform system (5) according to claim 1 comprising a plurality of recesses (41) which permit any supporting traverse joists or beams (45) to be received into said recesses (41) when said at least one elevation platform (20,20',20",71) is in its lowest position for providing a flush or substantially flush cargo floor (40) or fixed floor (72).

18. A cargo floor (40) or a fixed floor (72) according to claim 17 wherein at least two recesses (41) have been provided and between said at least two recesses (41) at least one pillar (42) is located said at least one pillar (42) having been lowered a distance h compared to the adjacent floor(40,72).

19. A cargo floor (40) or a fixed floor (72) according to claim 18 wherein the distance h is smaller than 10 mm, more preferably smaller than 8 mm but most preferably smaller than 5 mm.

20. A substantially U-shaped traverse joist or beam (45) for use in the construction of an elevation platform (20,20',20", 71), said elevation platform being for use with a platform system (5) according to claim 1, said substantially U-shaped traverse joist or beam (45) comprising a first section (46) so configured that upon lowering the at least one elevation platform (20,20',20",71), the substantially U-shaped traverse joist or beam (45) will guide itself into the recesses (41) and over the pillar (42); and a second section (47) so configured that when said substantially U-shaped traverse joist or beam (45) is in its lowest position and resting atop of the pillar (42), no or only little free space is present between said pillar (42) and said second section of the traverse joist or beam (45), and wherein said first (46) and second (47) sections are so arranged that upon lowering said substantially U-shaped traverse joist or beam (45) over said pillar (42), said first section (46) initially is closest to said pillar (42).

21. A substantially U-shaped traverse joist or beam (45) according to claim 20 having a first section (46), said first section being funnel shaped and having a funnel opening wherein said funnel opening is substantially wider than the width of said pillar (42), and a second section (47), said second section (47) having a width substantially corresponding to the width of said pillar (42).

22. A truck, lorry or trailer comprising a cargo space fitted with a platform system according to claim 1.

* * * * *